Sept. 2, 1969 J. RABINOW ETAL 3,465,317

MAGNETIC RECORDING ON PIECES OF MAIL AND THE LIKE

Filed May 4, 1959

INVENTOR.

JACOB RABINOW

BY

Max L. Libman

ATTORNEY

United States Patent Office 3,465,317

Patented Sept. 2, 1969

3,465,317

MAGNETIC RECORDING ON PIECES OF MAIL AND THE LIKE

Jacob Rabinow, Takoma Park, Md., assignor, by mesne assignments, to Control Data Corporation, Minneapolis, Minn., a corporation of Minnesota Filed May 4, 1959, Ser. No. 810,760
Int. Cl. G11b 5/00
U.S. Cl. 340—174.1 11 Claims

ABSTRACT OF THE DISCLOSURE

This invention relates to the art of recording magnetic indicia on the outside wrappers of objects such as letters, packages and so on.

There arises in the Post Office and in other fields where letters, checks, invoices, objects, and packages are handled, the problem of applying information to the outside of the package in such a manner as to be written and read by machine. Visible code marks are generally employed but these suffer from the difficulties of requiring very complicated printing equipment and complicated reading equipment for analysis, and must be placed on a blank area clear of other markings, which is difficult to insure in many cases. I have, therefore, invented a technique and machinery for applying a small amount of magnetic material to the surface of a letter or a package and means to record and read magnetic information in this magnetic ink.

One object of the invention is to apply magnetic ink to the outside of an envelope in such a manner as not to obliterate any of the printed or written information on the envelope.

Another object in the invention is enabling the writing and reading magnetic heads to make good contact with the surface of the envelope independently of its contents.

In one of the systems of sorting mail now being developed for the U.S. Post Office Department, the letters are machine-marked by human operators in such a way as to abbreviate the address in a manner such that subsequent machines are enabled to read the address and sort the letter according to the information contained in the marks. This has usually been done by placing optically detectable code marks on the mail. The advantages of using magnetic recording instead for this purpose are: the simplicity of the reading and writing equipment, which is essentially similar to that used for writing and reading of ordinary magnetic tapes; the ease with which the information can be erased and changed; the cheapness and simplicity of the magnetic heads; the high speed with which such reading and writing can be done; the fact that magnetic recording is not affected by the presence of printed or written material overlying or underlying the magnetic material; and the compactness of the information stored so that a very small area on the envelope or a package is required for magnetic recording.

However there are two difficult problems that arise in connection with applying magnetic recording to such things as envelopes. One is that the magnetic surface must be pressed firmly against the magnetic head to obtain good recording and good reading. The contents of the envelope are often such that ordinary pressure means do not produce the desired result. For this reason the present invention utilizes a system using vacuum to such the magnetic surface of the envelope against the magnetic head so that the contents of the envelope will have no physical effect on the recording and reading. The contents may have a magnetic effect, but we have found by experience that the pressence of ordinary material such as coins, paper clips, etc., has little effect on the recording. A large piece of permanently magnetized material such as Alnico can affect the magnetic head. Fortunately, Alnico is almost never sent in an envelope without being separately wrapped for physical protection and the problem is largely academic.

The other difficult problem, that of not obliterating anything on an envelope by the magnetic ink, is solved according to the invention by employing a light spray so that the amount of magnetic ink deposited is so small that any printed or written material on the envelope can be clearly seen through the spray. It should be understood that the particles of ink are not actually transparent. What is meant is that a spray of magnetic ink is so applied and the particles are so fine and so dispensed that a gray field results and that the printed material can be seen through this fine mosaic of magnetic ink particles. Since the magnetic head magnetizes a considerable area covered by these particles, it integrates a great many of them in a single magnetic "bit" and the film behaves for our purposes as if it were continuous.

The specific nature of the invention as well as other objects and advantages thereof will clearly appear from a description of a preferred embodiment as shown in the accompanying drawing, in which.

Figures 1, 2:
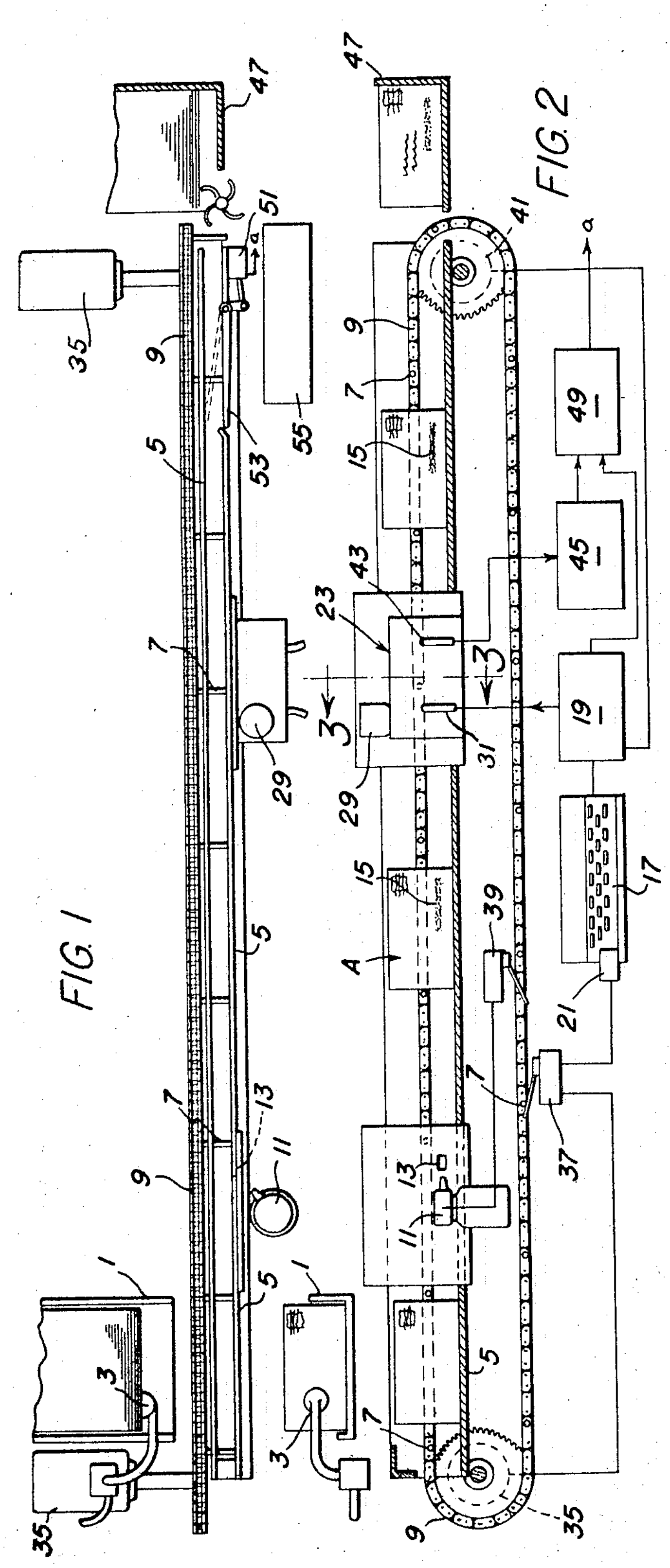
FIGS. 1 and 2 are plan and elevation views respectively of the overall plan of the machine, more or less schematically represented and with portions removed to better show operation than the structural details.

Referring to FIGS. 1 and 2 showing the overall system, the letters arriving in the Post Office are first "faced" and cancelled, and are delivered to the machine with the addresses all facing in one direction on a stack feeding table 1. The first step in the process of recording information magnetically is to have the letters picked up one at a time by a vacuum cup 3 and deposited in a conveyor channel 5. The letters are moved in the channel by fingers 7 driven by a suitable chain 9. As the letters move in the channel 5 they pass an air gun 11. This air gun sprays a fine mist of magnetic ink against the envelope through the window 13 for a short time while the letter is behind the window. A strip of magnetic material about three inches long and about one-quarter inch wide, indicated in FIG. 2 by numeral 15, is ample for the purpose. The ink used is of the rapid drying type and this, together with the very small amount needed, causes it to dry almost instantly. By the time the operator has read the address, the ink is completely dry. It should be understood that if desired, the letters can be pre-inked at a separate station.

The letter arrives at the station A where it stops while an operator reads the address. The operator then operates a keyboard 17 such as described in an application by William Fischer et al. for Photoelectric Keyboard Device, the output of which is fed into a magnetic storage register 19. When the operator is all through "typing" an abbreviated version of the address on the letter in front of him, he presses a finish key 21 and the finger 7 of the chain 9 moves the letter further to the right and brings it in contact with friction rollers in the magnetic recording assembly 23. The details of this assembly will be described below. As the letter is driven past the magnetic head, all of the information stored in the register 19 is fed into the recording head so that the letter leaves the recording station with the address information in magnetic form recorded on magnetic strip 15.

Figure 4:
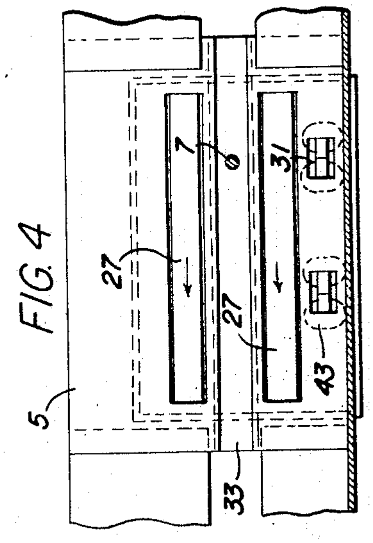
FIG. 4 is a sectional view taken at 4—4 in FIG. 3.
Figure 3:
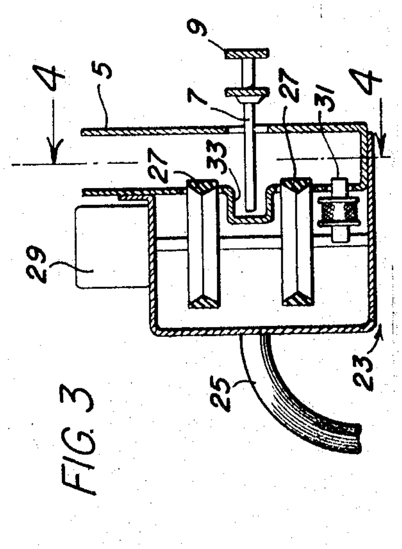
FIG. 3 is a sectional view taken at 3—3 in FIG. 2.

The details of the magnetic printing station are shown in FIGS. 3 and 4. A chamber 23 is connected to vacuum line 25. The chamber is provided with windows through which friction belts 27 protrude as shown in FIG. 3. These friction belts are driven constantly at a fixed speed as by motor 29 so that when a letter is pressed against them by the action of the vacuum inside the case, the letter is propelled in the direction of the arrows in FIG. 4. The magnetic head 31 also protrudes from inside the case as shown in FIG. 3. We found that a head approximately ¼" wide with a gap of about .005" gave us very satisfactory recording and reading. The groove 33 in the chamber provides clearance for the pins 7 that bring the letters into contact with the friction belts. The speed of the belts is either equal to the speed of the pins, or slightly higher, so that when a letter is being magnetically written upon or read, it is under the control of the friction belts. The information register 19 which may be of any known type feeds information out serially into the recording head 31 as the magnetic strips on the letters pass in contact with it.

The chain 9 may be powered by a motor 35 and controlled by a switch 37 in the path of fingers 7 and a switch on the "finish-key" 21 of keyboard 17. The timing of the air gun to spray ink at the proper time and the triggering of the information register to feed information into the magnetic head at the proper time are controlled by switches such as 39 in the path of fingers 7 or by switches such as 41 otherwise synchronized to chain 9. Or said timing may be controlled by photocells "looking" across channel 3, "watching" for letters. In practice, it is preferred to use photocells to control the air gun so that it will not spray ink into the channel if a letter is missing.

The structure of the information register is of secondary importance to the invention, but many forms of such storage registers are now available and are used in the computer art. The registers may consist of relays, magnetic cores, magnetic drums, and so on. They have the facility of recording information as fed by the key-board 17 and feeding the information out in serial form as they would do in a digital computer. A recording density of about 40 bits per inch is satisfactory for this purpose. When the information has been fed to the magnetic head 31, the register would normally be emptied. It is possible, however, to retain the information for a slightly longer period and check the recording on the letter by a reading head 43 located immediately following the writing head as shown in FIG. 4. The construction of the reading head may be identical with that of the writing head, and, in fact, we prefer to do this for the sake of simplicity and low cost. The reading head feeds the information into another register 45 and the information in the two registers is then compared to make sure that the letter has been correctly recorded. If the letter is correct, it passes onto a stacker such as 47 shown in FIG. 1. Such mail stackers are conventional equipment in the Post Office and need not be detailed here. If the magnetic recording is incorrect for some reason, the comparison device 49 sends a signal to solenoid 51 which moves a gate 53 into the path of the envelope and the letter is deflected into a "reject" box 55.

The letters from the stacker would normally be passed to a sorting machine such as described in our copending application Ser. No. 644,017, for Mechanical Coding and Sorting Device, filed Mar. 5, 1957, where they would be sorted by electronic and mechanical means. In the sorting machine, a magnetic head, of the type previously described, would read the information from the magnetic recording and feed this information into a memory to extract the sorting instructions.

It is obvious that while we describe the use of magnetic recording in connection with letter mail, the same technique can be applied to the writing and reading of magnetic information on packages except that in this case the feeding devices would have to be more sophisticated because of the variety of shapes and sizes, and because of the presence of tie strings, tapes, etc. The thing that is important is the fact that surrounding the head with a vacuum structure enables flexible sheet material such as paper to make good contact with the head, independently of the shape of the material on the other side of the paper. While we show that the piece moves past the stationary magnetic head, the action can be done in reverse, that is the head can be moved along the paper so that in the case of packages it may be preferable to move the head over the package which is standing still.

It will be apparent that the embodiments shown are only exemplary and that various modifications can be made in construction and arrangement within the scope of my invention as defined in the appended claims.

I claim:

1. A process of recording magnetic information on the surface of an envelope bearing optical markings on said surface, consisting of adherently depositing on an area of said surface including said markings and surface area adjacent to said markings, a thin, uniform, uninterrupted layer of magnetic particles through which said markings are visible; pressing the surface so formed against a magnetic writing head by air suction; moving the surface relative to a magnetic recording head in the plane of said surface, and selectively energizing said head to magnetically write bits of coded information on said layer during said relative motion.

2. Binary code identifying means for letter mail comprising means for depositing on a surface of said mail which may have optical markings thereon, fine discrete magnetized particles dispersed in a binder to form an adherent layer over any such markings and the adjacent surface sufficiently thin to reveal any optical markings on said surface beneath said layer, a magnetic recording head and means for moving said surface past said head with said layer in close contact therewith to record "bits" of data magnetically on selected portions of said layer.

3. The invention according to claim 2, said last means including means for producing differential air pressure on opposite sides of said surface to press said surface against said magnetic head.

4. The invention, according to claim 3, said means for depositing comprising a spray gun, and means for moving said mail past said spray gun with a desired portion of said surface exposed to the spray from said gun.

5. Magnetic code identifying means for letter mail comprising moving track means; means for depositing faced pieces of mail singly on said moving track means for transportation thereby; spray means adjacent said track means for depositing a fine adherent translucent film of discrete magnetic particles on a restricted surface portion of said pieces of mail as they move on the track means, said surface portion being large enough to include optical markings visible through said translucent film; a magnetic recording head adjacent said track, a magnetic reading head similarly positioned further along said track; pneumatic suction means for pressing said surface portion only of each piece of mail against said heads as the mail passes each head; means for recording coded information on said surface portion through said recording head, and means for reading coded information on said surface portion through said reading head.

6. The invention according to claim 5, including means for electrically comparing said recorded and said read information, and means operated by said comparing means for accepting or rejecting a piece of mail in accordance with the result of said comparison.

7. The invention according to claim 5, said spray means being electrically operated, and control means actuated by motion of said letter mail past the spray station for controlling said electrical operation to spray a selected portion of said surface.

8. The invention according to claim 5, including a keyboard operated coding device, a binary storage register connected to said keyboard device for storing coded information produced by operation of said keyboard device, and means for impressing said coded information upon said recording head when it is in operative relation to said surface portion.

9. In the process of magnetic reading and writing on a surface, the step of adherently depositing a layer of discrete magnetic particles uniformly on a selected area of the surface so thinly as to only partially obscure the surface with said magnetic material, leaving enough of the original surface visible so that optical marks on the surface can be seen through said layer, moving said surface relative to a magnetic writing head, and magnetically recording a "bit" of coded data on a small sub-area of the magnetic surface, said sub-area being large relative to the area of the discrete particles of magnetic material thereon.

10. In a magnetic recording and/or reading apparatus which has a conveyor to move, along a prescribed path, articles of different thicknesses and having two plys which establish two surfaces of each article; the combination of a magnetic head positioned along said path and across which one surface of each article is adapted to pass, and means including a vacuum chamber near said head and pneumatically exposed to one ply of each article as it passes thereby attracting that ply toward said head for contact therewith independently of the thickness of the article.

11. The subject matter of claim 10 wherein said means further include a movable device to propel the articles past said head with the articles being connected with said device by said pneumatic exposure acting upon said one surface and pulling it toward said movable device.

References Cited

UNITED STATES PATENTS

| | | | |
|---|---|---|---|
| 2,997,417 | 8/1961 | Dirks | 235—61.12 X |
| 2,775,405 | 12/1956 | Pastor | 235—61.12 |
| 2,784,392 | 3/1957 | Chaimowicz | 235—61.114 |
| 1,653,467 | 12/1927 | O'Neill | 235—61.114 |
| 2,671,034 | 3/1954 | Steinfeld. | |
| 2,814,440 | 11/1957 | McWhirter et al. | 346—22 |
| 2,849,542 | 8/1958 | MacChesney | 235—61.114 |
| 2,871,289 | 1/1959 | Cox et al. | |
| 2,547,838 | 4/1951 | Russell | 235—61.12 |
| 2,648,589 | 8/1953 | Hichman | 179—100.2 X |
| 2,801,796 | 8/1957 | Noon et al. | 340—174 X |
| 2,914,746 | 11/1959 | James | 340—174 X |

OTHER REFERENCES

"Magnetic Sorting of Unlabeled Food Cans," Electronics, September 1965, pp. 100–105.

TERRELL W. FEARS, Primary Examiner

VINCENT P. CANNEY, Assistant Examiner

U.S. Cl. X.R.

235—61.114; 346—74